April 28, 1936.  R. H. BARNARD  2,038,519
MACHINE FOR FORMING GLASS ARTICLES
Filed Dec. 31, 1934  2 Sheets-Sheet 1
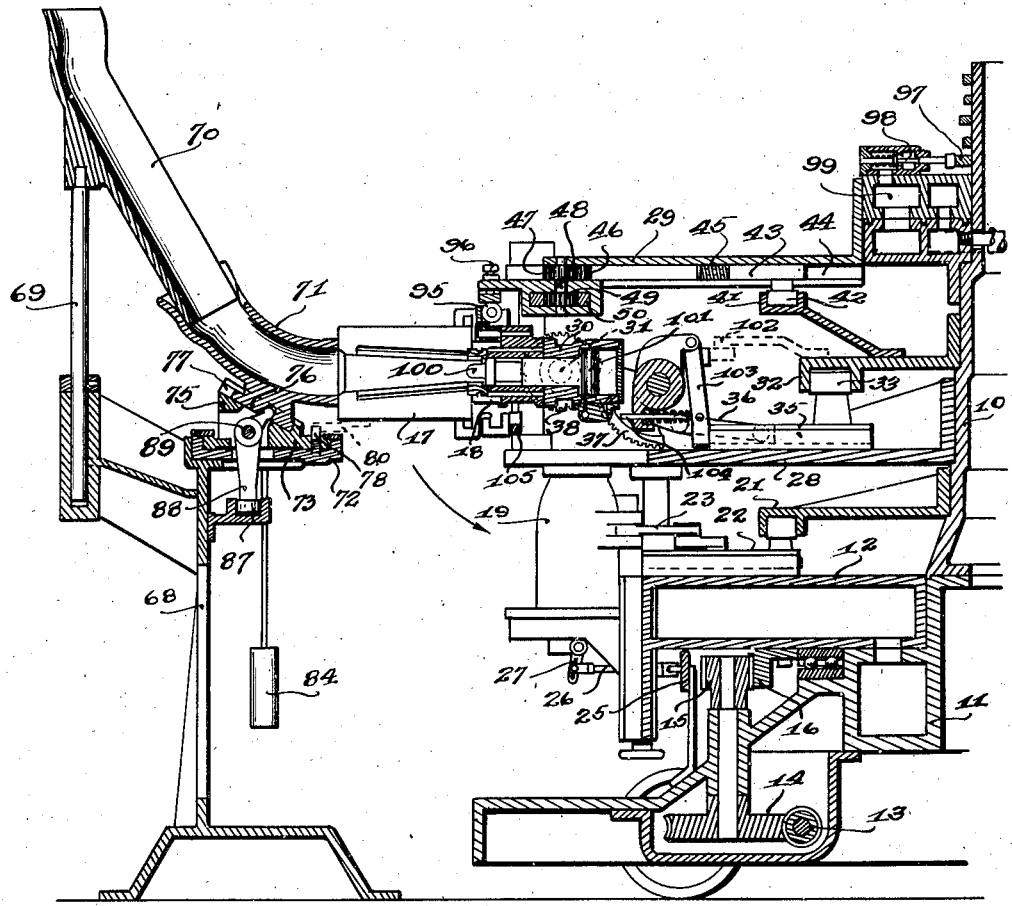
Randolph H. Barnard
INVENTOR.
BY J. F. Rule
ATTORNEY

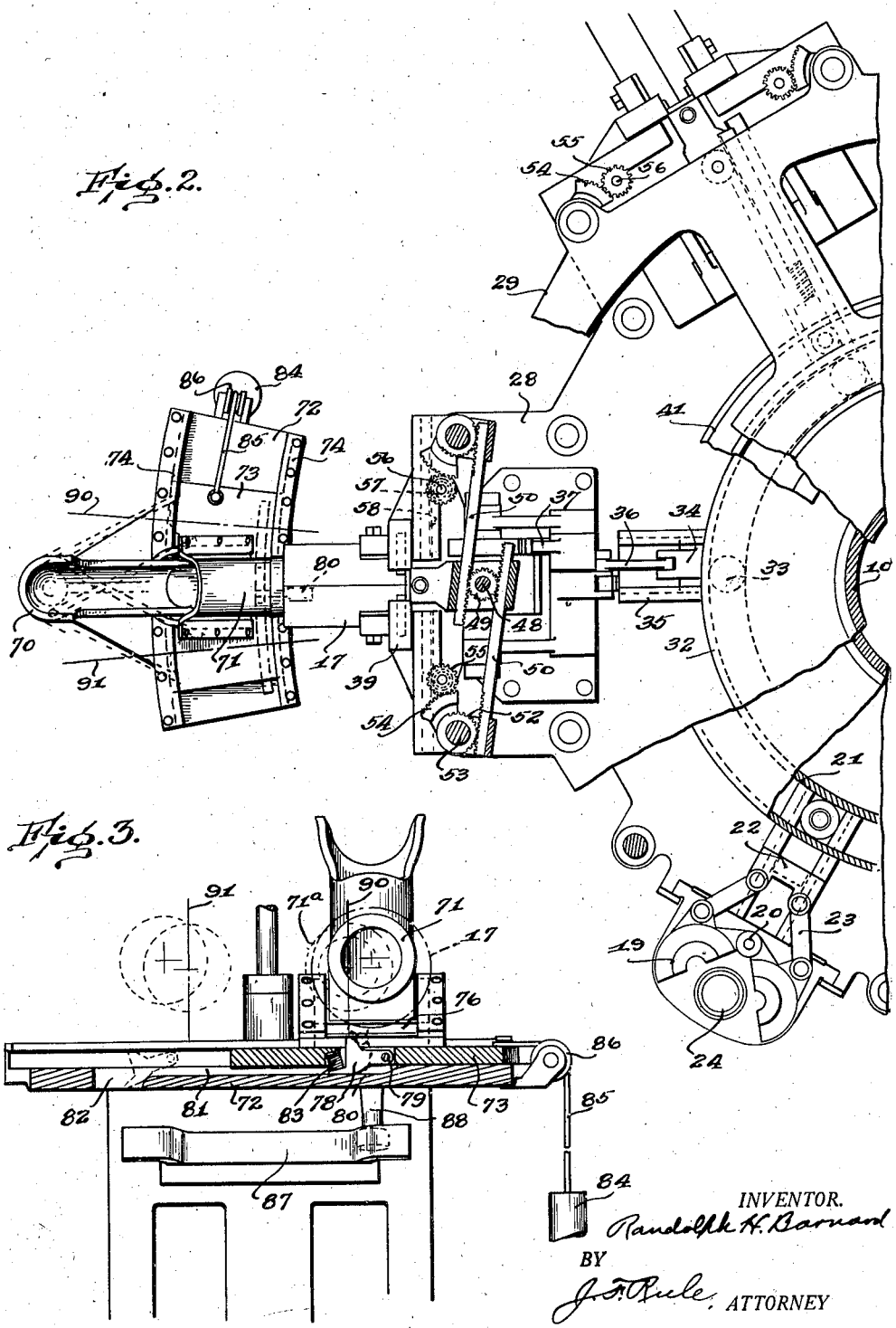

Patented Apr. 28, 1936

2,038,519

UNITED STATES PATENT OFFICE 2,038,519

MACHINE FOR FORMING GLASS ARTICLES

Randolph H. Barnard, Toledo, Ohio, assignor to Owens-Illinois Glass Company, a corporation of Ohio Application December 31, 1934, Serial No. 759,946

19 Claims. (Cl. 49—5)

My invention relates to mechanism for forming hollow glassware such as bottles, jars and the like which are blown in molds. More particularly, the invention relates to glass blowing machines of the type in which the individual mold charges or gobs are introduced into the molds after the charges have been separated from a supply body of molten glass.

In machines of this type, it is customary to feed the gobs or mold charges by gravity into the open upper ends of inverted parison molds, each comprising a body blank mold and a neck mold in register therewith. The parison mold with the parison therein may then be swung downward to an upright position, the body blank mold opened, and a finishing mold then closed about the suspended parison which is finally blown therein to finished form.

An object of the present invention is to provide an improved method and means for introducing the charges of glass into the blank mold while the latter is supported in a horizontal position and which will permit the use of suction in an effective manner for drawing the charges of glass into the mold and causing them to fully conform to the shape of the mold.

A further object of the invention is to provide a machine in which the blank molds extend outwardly from their support in a horizontal direction radial to the mold carriage for receiving the charges of glass.

A further object of the invention is to provide a novel and practical apparatus for directing and transferring gobs or charges of glass into a blank mold while the latter is retained in a horizontal position on a mold carriage and while the carriage is rotating.

Other objects of the invention will appear hereinafter.

Referring to the accompanying drawings:

Fig. 1 is a sectional elevation of a glass blowing machine and apparatus for transferring charges of glass to the molds, only that portion of the machine on one side of the vertical center line being shown.

Fig. 2 is a part sectional plan view of the same.

Fig. 3 is a detail part sectional elevation of the gob transfer mechanism.

The blowing machine herein shown, embodies many features of construction which are well known in the art, and particularly in machines of the gob fed type as shown, for example, in the patent to LaFrance, 1,878,863, September 20, 1932, to which reference may be had for a fuller disclosure of such conventional features. The machine as illustrated, comprises a central stationary column 10 mounted on a wheeled base 11, and a mold carriage 12 rotated continuously about the vertical axis of said column. The means for rotating the carriage comprises a drive shaft 13 operating through a worm gear 14 and pinion 15, the latter driving a ring gear 16 on the mold carriage. An annular series of mold groups are supported on the mold carriage, each group comprising a body blank mold 17, a neck mold 18 in register therewith, and a finishing mold 19.

The finishing molds and means for opening and closing them, as shown, are of conventional form. Each mold comprises partible sections mounted to swing about a vertical hinge pin 20. The opening and closing movements of the mold are under the control of a stationary cam 21 which operates a slide 22 connected through links 23 to the mold sections. A finishing mold bottom 24 is swung upward to mold closing position by a stationary cam 25 operating through means including a rod 26 and lever 27.

Each parison mold includes a horizontally disposed body blank mold 17 arranged with its axis extending radially of the mold carriage, and a neck mold 18 at the inner end of the blank mold. The parison mold is supported between spiders 28 and 29 which form part of the mold carriage. The neck mold is supported on a carrier 30 which is mounted to swing about the axis of a horizontal shaft 31 for swinging the neck mold with a bare parison supported thereby in a horizontal position (Fig. 1), downward through an angle of 90 degrees to a position in which the parison depends vertically from the neck mold. This swinging movement of the neck mold is under the control of a stationary cam 32 on which runs a cam roll 33 on a slide block 34 movable radially of the mold carriage in guides 35. The slide block has a link connection 36 with a gear segment 37 which drives a gear wheel 38 fixed to the shaft 31.

The blank molds 17 are preferably split molds of conventional construction, such as shown, for example, in the LaFrance patent above identified. The mold sections are carried on slides 39 for bodily movement toward and from each other. These opening and closing movements of the mold sections are under the control of a stationary cam 41 on which runs a roll 42 carried by a slide bar 43 mounted for movement radially of the mold carriage in a guideway 44. The slide bar 43 is made in sections having a spring connection 45 to serve as a safety device. The outer end of the bar 43 is formed with rack teeth 46 which engage a pinion 47 on a stud shaft 48. On the lower end of the shaft 48 is a pinion 49 which drives a pair of rack bars 50. These rack bars extend horizontally substantially in their direction of travel with the mold carriage. The rack bars are provided adjacent their outer ends, with rack teeth which engage gear segments 52 on shafts 53 which carry gear segments 54 running in mesh with pinions 55 on shafts 56. Gears 57 on the shafts 56 mesh with racks 58 on the mold carriers 39.

Charges of molten glass are supplied to the molds from a feeder which may be of conventional construction, comprising a forehearth or extension 65 of a furnace tank. The glass issues from an outlet in the bottom of the forehearth in the form of gobs or mold charges 66 which are severed by a cutter 67. The size and shape of the gobs may be controlled in a conventional manner. The gob forming mechanism is operated in synchronism with the travel of the mold carriage to deliver a gob to each blank mold as it is brought to the charging station.

The mechanism for transferring the gobs to the mold comprises a supporting frame 68 on which is mounted a vertical stem 69 carrying an open chute or trough section 70. The upper end of the trough is arranged in line with the stem 69 and directly beneath the feeder outlet. At the lower end of the section 70 is a section 71 in the form of a funnel or tubular guide, the upper end of which has a telescopic connection with the lower end of the trough 70. The funnel forms a continuation of the chute 70 and completes the passageway through which the mold charges are transmitted to the mold.

The funnel 71 is curved to deflect the mold charges from the inclined direction of the open chute 70 to a substantially horizontal direction, so that said charges move horizontally into the blank mold, the outer open end of the mold being in register with the funnel and abutting the lower end thereof during the charging operation. The end surface of the funnel 71, as shown, is vertical and makes a substantially air tight seal with the vertical outer end of the mold.

The funnel guide 71 is adapted to register with each blank mold in succession as the molds are brought to the charging zone, travel with each mold through a predetermined distance, and then be withdrawn from the mold and returned to a position for registration with the next succeeding blank mold. The mechanism for effecting these movements will now be described.

Mounted on the frame 68 is a stationary horizontal platform 72. A carrier 73 overlies the platform 72 and is adapted to be reciprocated horizontally thereon. The carrier 73 runs in guideways 74 on the platform 72, said guideways extending in arcs concentric with the mold carriage. The carriage 72 is formed with an extension or supporting block 75, the upper face of which is inclined downwardly and inwardly toward the mold carriage and provides a bearing face for a correspondingly shaped slide block or bearing 76 formed on the funnel 71. Guideways 77 are provided on the block 75 to receive the bearing 76.

Each blank mold as it approaches the charge receiving position, makes a driving connection with the carrier 73 for causing the funnel and chute to advance with the mold while a charge of glass is being transmitted to the mold. This driving connection is effected by means of a dog 78 pivoted at 79 on the carrier 73. The dog projects upwardly into the path of a pin 80 fixed to one section of the blank mold and projecting forwardly therefrom, each blank mold being provided with such a pin. The dog is held up in the path of the pin 80 by the platform 72, the latter formed with a recess 81 forming a runway for the dog.

As the advancing mold approaches the charging position, the pin 80 engages the dog 78 so that the carrier 73 is advanced with the mold along the stationary platform. As the carrier completes its forward movement with the mold, the dog 78 is brought over an opening 82 in the platform and drops out of engagement with the pin 80, thereby releasing the mold. A coil spring 83 insures a positive action of the dog 78. When released from the mold, the carrier 73 is automatically returned by means of a weight 84 connected to the carrier by a cord 85 running over a pulley 86 on the end of the platform.

The movement of the funnel 71 into and out of engagement with the mold is controlled by a stationary cam 87 on the frame 68. The cam operates through a lever 88 fulcrumed at 89 in a recess in the block 75, said lever having an arm engaging the bearing block 76 on the funnel. The cam 87 is shaped to move the funnel downward along the inclined guideways 77, into engagement with the mold just after the carrier 73 commences its travel with the mold. Thus, as shown in Fig. 3, the mold 17, indicated in broken lines, has just reached the position where the pin 80 engages the dog on the carrier. The funnel 71 is at this time in its retracted or upper position, as shown in full lines. As the funnel advances with the carrier from this position, the cam 87 operates through the lever 88 to move the funnel downward to the dotted line position 71ᵃ (Fig. 3) in which it is in sealing engagement with the mold and concentric with the mold cavity. The center line of the mold and funnel is now at a position indicated by the broken line 90. The funnel remains in register with the mold until the center line thereof reaches a position indicated by the line 91. The cam 87 then withdraws the funnel during the final forward movement of its travel before the carrier 73 is released from the mold. The funnel section 71 has a driving connection with the chute 70 so that the latter is oscillated about the vertical axis of its supporting stem 69 as the funnel reciprocates.

The upward swinging movement of the neck mold 18 is limited by a stop 95 (Fig. 1) which may be adjusted by means of an adjusting screw 96. Suction is applied within the parison mold while a charge of glass 66 is being introduced into the mold and formed therein. The application of suction may be controlled by a cam 97 on the column 10 which operates a valve 98 to establish communication from a vacuum chamber 99 to a vacuum line leading to the mold. Suction may thus be applied to a mold as the mold charge is passing through the funnel 71 and entering the mold. This suction supplements the action of gravity in transferring the glass to the mold and insures a rapid and positive movement of the glass into the mold. The suction then serves the usual function of completely exhausting the air from the mold and causing the glass to be compacted in the mold and fully conform to the shape of the mold cavity. A neck pin 100, operated by an air motor 101, projects into the mold cavity and operates as usual to form an initial blow opening in the parison.

After the parison has been formed in the parison mold, the cam 41 operates in the manner heretofore described, to separate the blank mold sections, leaving the bare parison supported by the neck mold. The cam 33 then operates to swing the neck mold downward about the axis 31 so that the bare parison carried thereby is swung downward from a horizontal to a vertical position in which it depends from the neck mold between the open sections of the finishing mold 19. The latter is then closed about the parison and the neck mold is opened.

The neck mold opening means includes a stationary cam 102 which operates through an arm 103 to project a rod 104 which engages a neck mold opening frame 105, causing the latter to separate the neck mold sections. The construction and operation of the neck mold and its opening mechanism may be substantially the same as the corresponding mechanism fully disclosed in the LaFrance patent above identified. The parison is blown in the finishing mold in the usual manner, after which the mold is opened, leaving the blown article supported on the mold bottom 24 which is then tilted under the control of the cam 25 to discharge the article from the machine.

Modifications may be resorted to within the spirit and scope of my invention.

I claim:

1. Glass molding apparatus comprising in combination a mold having an elongated mold cavity, means for supporting the mold with said cavity extending horizontally, and automatic means for introducing a charge of molten glass horizontally into the mold cavity while in said position, said automatic means including means for exhausting the air from the mold cavity in advance of the entering charge of glass.

2. Glass molding apparatus comprising in combination a mold open at one end to receive a charge of glass, means for supporting the mold in a horizontal position, automatic means for feeding a mold charge of molten glass by gravity to the mold and causing it to move horizontally into the mold while the latter is in said position, and means for exhausting the air from the mold cavity during the introduction of the charge of glass thereinto.

3. Glass molding apparatus comprising in combination a mold open at one end to receive a charge of glass, means for supporting the mold in a horizontal position, automatic means for feeding a mold charge of molten glass by gravity to the mold and causing it to move horizontally into the mold while the latter is in said position, and means operable during the entrance of the glass into the mold, for exhausting the air from the mold cavity in advance of the entering glass and thereby causing atmospheric pressure to assist in introducing the charge into the mold and shaping it therein.

4. The combination of a mold carriage, means to rotate it horizontally, a mold, means for supporting the mold in a horizontal position on the carriage, and automatic means for introducing a charge of glass horizontally into the mold while the mold is rotating with the carriage.

5. The combination of a mold carriage, means to rotate it horizontally, a mold, means for supporting the mold in a horizontal position on the carriage, and automatic means for introducing a charge of glass horizontally into the mold during the travel of the mold with the rotating mold carriage and while the mold is in said horizontal position.

6. The combination of a mold carriage, means to rotate it about a vertical axis, a mold supported on and rotating with the carriage with the mold cavity extending horizontally in a direction radial to the mold carriage and open at its outer end, and means for automatically introducing a charge of glass into the mold cavity through the said outer end thereof during said rotation of the mold and while the mold cavity extends in said direction.

7. The combination of a mold carriage, means to rotate it about a vertical axis, a mold supported on and rotating with the carriage with the mold carriage extending horizontally in a direction radial to the mold carriage and open at its outer end, and means for automatically introducing a charge of glass into the mold cavity through the said outer end thereof during said rotation of the mold and while the mold cavity extends in said direction, said means including a guide, means for periodically bringing the guide into register with the mold cavity, and means for causing a gravity movement of charges of molten glass along said guide and into the mold cavity.

8. The combination of a blank mold having an elongated mold cavity opening through one end of the mold, means for supporting the mold with said cavity extending horizontally, means for introducing a charge of molten glass through said open end while the mold is thus supported and forming a parison in the mold, a vertically disposed finishing mold, means for opening the blank mold, means for supporting the bare parison with the latter extended in a horizontal direction during the opening of the blank mold, and means for swinging the parison downward and enclosing it in the finishing mold.

9. The combination of a horizontally disposed parison mold comprising a body blank mold and a neck mold in register therewith, a vertically disposed finishing mold, means for opening and closing the finishing mold, means for opening the blank mold while horizontally disposed, leaving the bare parison supported by and projecting horizontally from the neck mold, and means for swinging the neck mold with the bare parison supported thereby, about a horizontal axis and thereby swinging the parison from a horizontal position to a vertical position.

10. The combination of a blank mold open at one end to receive a charge of glass, a neck mold at the opposite end of the blank mold and in register therewith, means for supporting the blank mold in a horizontal position, means for introducing a charge of glass into the blank mold through said open end thereof while the blank mold is in said horizontal position, means cooperating with said molds to form a parison therein, means for opening the blank mold while horizontally disposed and leaving the bare parison projecting horizontally from and supported by the neck mold, means for swinging the neck mold about a horizontal axis and thereby swinging the parison to a vertical position, a vertically disposed finishing mold, and means for causing the vertical parison to be enclosed in the finishing mold.

11. The combination of a blank mold open at one end to receive a charge of glass, a neck mold at the opposite end of the blank mold and in register therewith, means for supporting the blank mold in a horizontal position, means for introducing a charge of glass into the blank mold through said open end thereof while in said horizontal position, means cooperating with said molds to form a parison therein, means for opening the blank mold and leaving the bare parison projecting horizontally from and supported by the neck mold, means for rotating the neck mold about a horizontal axis in a direction to swing the parison from a horizontal to a depending vertical position, a finishing mold, and means for causing it to enclose the depending parison.

12. The combination of a mold carriage, means for rotating it about a vertical axis, a horizontally disposed blank mold supported on the mold carriage with the mold cavity extending horizontally in a direction radial to the axis of rotation of the mold carriage, said mold cavity opening through the outer end of the mold, and automatic means for introducing a charge of molten glass through said open end into the mold cavity while the mold is horizontally disposed.

13. The combination of a mold carriage, means for rotating it about a vertical axis, a horizontally disposed blank mold supported on the mold carriage with the mold cavity extending horizontally in a direction radial to the axis of rotation of the mold carriage, said mold cavity opening through the outer end of the mold, and automatic means for introducing a charge of molten glass through said open end into the mold cavity during the travel of the mold with the mold carriage, and while the mold is horizontally disposed, said automatic means including a guide mounted separately from the mold carriage, means for causing the guide to periodically register with the mold cavity and travel therewith through a predetermined distance, and means for supplying mold charges and causing them to move along said guide and into the mold while the guide is in register with the mold.

14. The combination of a mold carriage, means for rotating it about a vertical axis, a mold thereon, charging mechanism for introducing charges of molten glass into the mold, said mechanism including a funnel guide, a carrier on which said guide is supported, means for periodically causing the carrier to advance horizontally with the mold in an arc concentric with said axis, and means for moving said guide on its carrier in a direction transverse to the said movement of the carrier and thereby moving said guide into and out of register with the mold cavity.

15. The combination with a mold carriage rotatable about a vertical axis and a horizontally disposed mold thereon extending radially of the mold carriage and open at its outer end to receive a charge of molten glass, of mechanism for transferring a charge of glass to the mold, said mechanism comprising a hollow guide, means for reciprocating the guide horizontally and thereby causing it to periodically advance with the traveling mold, and means for moving said guide into and out of register with the mold cavity while advancing with the mold.

16. Mechanism for transferring charges of glass from a feeder to a mold comprising an inclined chute mounted to oscillate about a vertical axis, the upper end of the chute being positioned with said axis extending therethrough, a guide at the lower end of said chute forming a continuation thereof, means for reciprocating said guide horizontally and causing it to oscillate said chute about said vertical axis, and means for reciprocating said guide in a direction transverse to that of its movement with said chute.

17. Mechanism for transferring charges of glass from a feeder to a mold comprising an inclined chute mounted to oscillate about a vertical axis, the upper end of the chute being positioned with said axis extending therethrough, a guide at the lower end of said chute forming a continuation thereof, means for reciprocating said guide horizontally and causing it to oscillate said chute about said vertical axis, and means for reciprocating said guide in an inclined direction toward and from said vertical axis for moving the guide into and out of register with a mold.

18. The combination of a mold carriage, means for rotating it about a vertical axis, an annular series of molds supported on the carriage with the mold cavities extending horizontally in directions radial to said axis and opening through the outer ends of the molds, means for introducing charges of molten glass into the molds through said outer ends, while the mold cavities extend horizontally and radial to said axis, and means cooperating with the molds for forming parisons therein, each said mold comprising horizontally separable sections, and means for separating said sections.

19. The combination of a mold carriage, means for rotating it about a vertical axis, an annular series of molds supported on the carriage with the mold cavities extending horizontally in directions radial to said axis and opening through the outer ends of the molds, means for introducing charges of molten glass into the molds through said outer ends while the mold cavities extend horizontally and radial to said axis, and means cooperating with the molds for forming parisons therein, each said mold comprising horizontally separable sections, means for separating said sections, vertically disposed finishing molds mounted on the mold carriage, and means for transferring parisons from said horizontal molds to the finishing molds.

RANDOLPH H. BARNARD.